April 2, 1968 W. J. ACHRAMOWICZ 3,376,384

RECEIVER TO TELETYPEWRITER CONVERTER

Filed March 10, 1964 5 Sheets-Sheet 1

INVENTOR.
WILLIAM J. ACHRAMOWICZ

BY Wade Koontz
George Fine

ATTORNEYS

INVENTOR.
WILLIAM J. ACHRAMOWICZ
BY Wade Koontz
George Fine
ATTORNEYS

RECEIVER TO TELETYPEWRITER CONVERTER

Filed March 10, 1964 5 Sheets-Sheet 3

INVENTOR.
WILLIAM J. ACHRAMOWICZ
BY
Wade Koontz
George Fine
ATTORNEYS

INVENTOR.
WILLIAM J. ACHRAMOWICZ
BY Wade Koontz
George Fine
ATTORNEYS

INVENTOR.
WILLIAM J. ACHRAMOWICZ
BY Wade Koontz
George Fine
ATTORNEYS 3,376,384
Patented Apr. 2, 1968

3,376,384

RECEIVER TO TELETYPEWRITER CONVERTER

William J. Achramowicz, Cherry Valley, Mass., assignor to the United States of America as represented by the Secretary of the Air Force Filed Mar. 10, 1964, Ser. No. 350,921
1 Claim. (Cl. 178—26)

ABSTRACT OF THE DISCLOSURE

Code converter having a ring counter to sequentially gate amplifiers for alternately transferring pulse information into two storage registers for changing to DC levels of the same pattern as the pulse information. The DC levels are used to gate amplifiers to transfer information alternately into a shift register. "Start" and "stop" pulses cause the information to be shifted out for operating a teletypewriter.

The invention described herein may be manufactured and used by or for the United States Government for governmental purposes without payment to me of any royalty thereon.

This invention relates to communication systems utilizing synchronous operation of the five unit coded data-defining elements of teletypewriter characters. More particularly, the device of this invention accepts the continuous synchronous coded output from a receiver, changes its frequency, adds a "start" space and "stop" mark, and operates the appropriate character key of a teletypewriter.

The theory of synchronous communication utilizing radio telegraphy for low noise reception has been applied in many types of apparatus to provide a high reliability communication network. This invention pertains to a synchronous communication system where the output of a teletypewriter, consisting of a 22 millisecond "start" space, five 22 millisecond information marks or spaces, and a 31 millisecond "stop" mark, is converted to a synchronous output with the "start" space and "stop" mark omitted and the length of each information position increased to 30 milliseconds. Thus any single teletypewriter character is converted to an information band 150 milliseconds wide made up of marks and spaces each 30 milliseconds wide; two consecutive characters are made up of an information band 300 milliseconds wide without "start" spaces or "stop" marks.

This invention relates to the receiving end of such a system, where synchronous pulses representing the data-defining elements of a teletypewriter character, are converted to 22 millisecond pulses with a "start" space and a "stop" mark added in order to operate the appropriate character key of a teletypewriter.

It is accordingly one object of this invention to provide an electronic code converter to accept the continuous synchronous data-defining elements of a teletypewriter character from a radio receiver and operate a teletypewriter.

It is a further object of this invention to provide a converter which is compact, lightweight, and requiring low power consumption.

Other features and advantages not enumerated will become apparent from the following detailed descriptions and appended claim, when read in the light of the attached drawings of which:

FIGS. 2A and 2B are a series of correlated wave forms at various terminals of FIG. 1;

Figure 1:
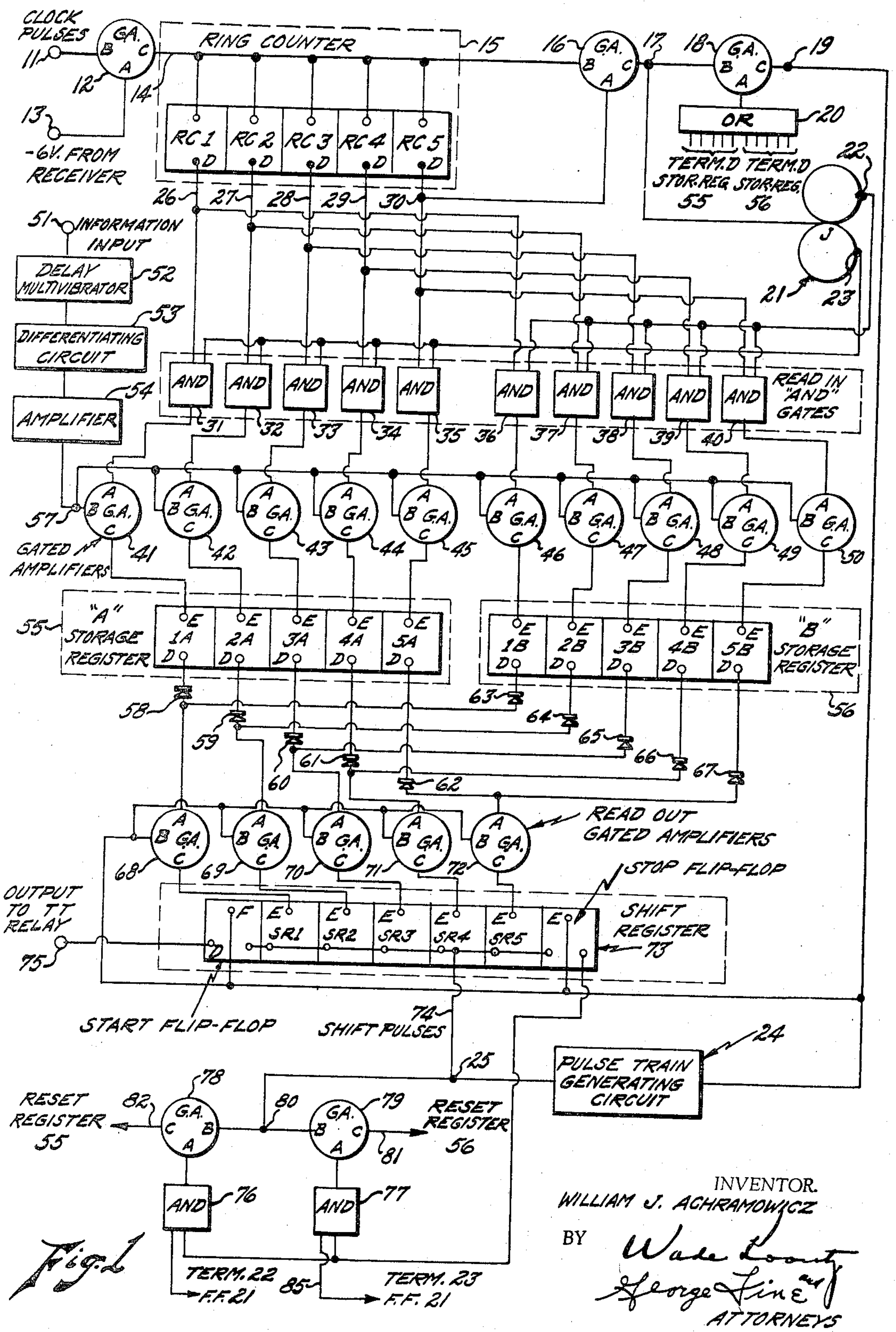
FIG. 1 is a schematic diagram showing the essential parts of the invention and their interconnection.
Figure 22:
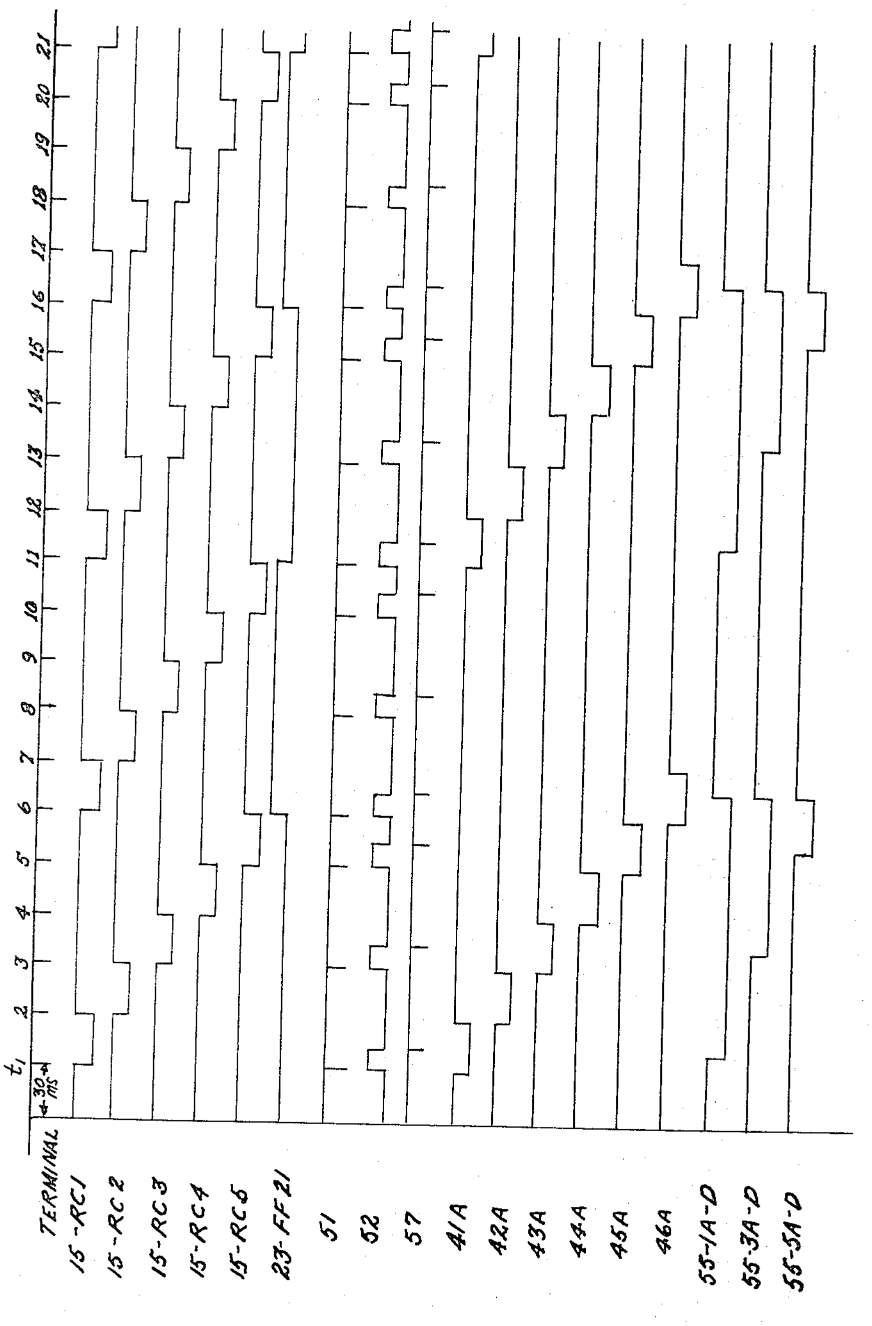

The general method of operation of the converter will be described with reference to the block diagram of FIG. 1 and the timing diagram of FIGS. 2A and 2B. In FIG. 1, synchronizing timing pulses from a receiver are applied to terminal 11 and through an amplifier 12 to ring counter 15; information pulses from the receiver are applied to terminal 51, and are fed to a series of gated amplifiers 41 through 50 through delay multivibrator 52, differentiating circuit 53, and pulse amplifier 54. Voltage levels from the ring counter are transferred to "and" gates 31 to 40 through lines 26 to 30; the other input to the "and" gates is taken from each side of bistable multivibrator 21, terminal 23 feeding "and" gates 31 to 35, and terminal 22 feeding "and" gates 36 to 40.

Delayed information pulses are fed in parallel to gated amplifiers 41 to 50, which are enabled by "and" gates 31 to 40. The output pulse of the gated amplifiers is fed to two storage registers 55 and 56, each of which contain five information bits, stored in bistable multivibrators 1A to 5A, and 1B to 5B; the voltage levels of these registers in turn enable gated amplifiers 68 to 72 through isolating diodes 58 to 67.

Bistable multivibrator 21 is switched by each fifth synchronizing pulse which is derived from gated amplifier 16; this pulse is also fed to gated amplifier 18 which is enabled by a 10 input "or" gate, the inputs of which are derived from the 10 flip-flops of storage registers 55 and 56. The output pulse of gated amplifier 18 is used to derive a pulse train of six pulses from the pulse train generating circuit 24; this pulse is also used as the input pulse to gated amplifiers 68 to 72, which are used to place the information stored in storage registers 55 and 56 into shift register 73, and is also used to place a "space" into the "start" multivibrator and a "stop" mark into the "stop" multivibrator of shift register 73.

The output pulse train of pulse train generating circuit 24 supplies the shift pulses to shift register 73, and supplies a reset pulse for resetting storage registers 55 and 56; these registers are reset by a pulse from gated amplifiers 78 and 79 enabled by "and" gates 76 and 77, the inputs of which are connected to "stop" flip-flop of shift register 73 and terminals 22 and 23 of flip-flop 21.

The general method of operation is as follows: a ring counter is used to sequentially gate amplifiers, allowing information pulses to pass through, so that the pulse information is alternately transferred into two storage registers, where it is changed to DC levels of the same pattern as the pulse information. These levels are then used to gate amplifiers so that the same information is alternately transferred into the seven stage shift register. Here a 22 millisecond "start" space and an 18 millisecond "stop" mark are introduced, and the information is shifted out in the form of 22 ms. pulses to operate a relay which operates the appropriate character key of a teletypewriter.

In the following description of the operation of this circuit, the terminology used is as follows: a flip-flop refers to a bistable multivibrator which can exist indefinitely in either of two stable states and can be caused to make an abrupt transition from one state to the other upon application of a pulse to either terminals E, F, or J; the "high" or the enable side of a flip-flop refers to terminals D which are at −6 volt potential while a "disable" or "low" side of a flip-flop refers to these terminals when they are at 0 volts potential. The pulse input terminals of a flip-flop are at E, F, and J; a pulse applied at terminal E of a flip-flop will cause terminal D to switch to —6 volts, unless terminal D is initially at —6 volts, in which case no change will occur in the state of the flip-flop. A pulse applied at terminal F will cause terminal D to switch to —6 volts, unless terminal D is at the —6 volt potential initially. Terminal J is the complementary pulse input terminal of the flip-flop; a pulse applied at terminal J will cause the flip-flop to change state regardless of the initial state of the flip-flop.

In the gated amplifiers, the pulse input terminal is at B, the pulse output terminal is at C, while a voltage enable level from a flip-flop or gate is applied at terminal A. An enable voltage of —6 volts applied at terminal A will allow passage of a pulse through the amplifier, while a disable voltage of 0 volts at terminal A will prevent any pulse from passing through the amplifier. Negative pulses of approximately .5 microsecond pulse width and of 5 volts, amplitude are used throughout the network.

The monostable or delay multivibrator has one permanently stable state and one quasi-stable state; a triggering pulse applied at the input causes an abrupt transition from the stable state to the quasi-stable state, which in the following description lasts for 11 milliseconds; the monostable multivibrator then returns from the quasi-stable state to its stable state very suddenly, with no external signal required to induce the change.

Figure 2B:
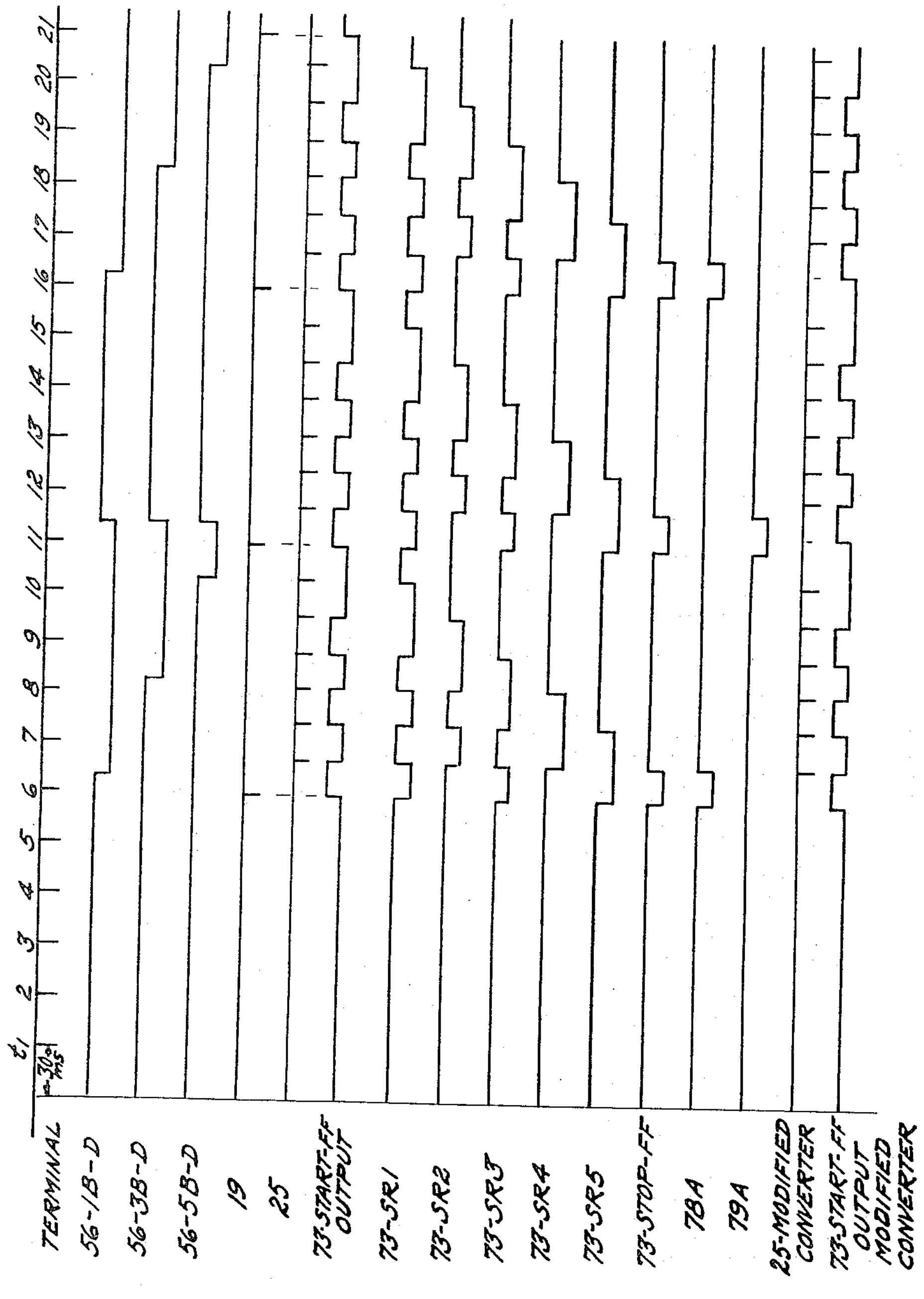

The timing diagrams, FIG. 2A and 2B, and the block diagram, FIG. 1, will be referred to in describing the detailed operating procedure of the converter.

The operation of the converter is as follows: in the initial condition, gated amplifier 12 is disabled, so that ring counter 15 is inoperative; since the ring counter operates in synchronism with a ring counter at the transmitter, the correct starting position of the ring counter is of the utmost importance if information is to be successfully transmitted. In the initial condition, the RC5 flip-flop output of ring counter 15 is enabled, with the remaining ring counter flip-flops disabled at 0 volts. Flip-flop 21 may be in any position at the start, with either terminal 22 or 23 at —6 volts. All storage flip-flop outputs of registers 55 and 56 are initially disabled, since they contain no information. In shift register 73, the "start" flip-flop output is enabled, while the remaining flip-flops are disabled.

Upon the application of —6 volts to terminal 13 from the receiver, gated amplifier 12 becomes enabled, allowing clock synchronizing pulses from the receiver to pass through. The application of —6 volts to terminal 13 occurs at the same time at both the transmitting and receiving converters, thus allowing synchronization of the transmitting and receiving ring counters. These negative pulses are spaced 30 ms. apart, so that in every 150 ms. interval, each flip-flop of the counter is enabled for a period of 30 ms., the enable passing successively from flip-flop RC1 to RC2 through to RC5 and then repeating. The waveforms of the ring counter stages are shown in FIG. 2A, terminals 15–RC–1 to 15–RC–5.

Flip-flop 21 is a switching flip-flop which transfers the enable from the ring counter through a series of "and" gates 31 to 40 into either the A or B banks of gated amplifiers. As shown in FIG. 2A, ring counter flip-flop RC5 enables gated amplifier 16 so that every fifth clock pulse passes through GA16 to switch flip-flop 21, since the pulse is applied at the complementary input J of FF21. Consequently, terminal 22 of flip-flop 21 is alternately enabled for 150 ms. and disabled for 150 ms. Hence for every ten synchronizing clock pulses, the ring counter goes through two complete cycles of operation while flip-flop 21 goes through one complete cycle.

The "and" gates are the usual coincident gates which provide an output only when all input lines are energized at the same time. The "or" gates provide an output when any one or combination of input lines are energized.

In FIG. 1, it can be seen that if terminal 23 of flip-flop 21 and the output terminal D of ring counter flip-flop RC1 are both enabled, the enable voltage will be transferred through "and" gate 31 to terminal A of GA41. 30 ms. later, RC2 becomes enabled so that a —6 volt enable is transferred through "and" gate 32 to GA42; succeeding clock synchronizing pulses drive the ring counter so that a —6 volt enable is applied sequentially through "and" gates 33, 34, and 35 to GA's 43, 44, and 45 respectively. Flip-flop RC5, which caused an enable to be applied to GA45, also caused GA16 to become enabled, so that the same pulse which transferred the enable of counter 15 from RC5 to RC1 also passed through GA16 to switch flip-flop 21, causing terminal 22 to become enabled. Consequently, the next five clock pulses will drive the ring counter to cause GA's 46 to 50 to become enabled for 30 ms. intervals, through "and" gates 36 to 40. Hence, with no information pulses applied at terminal 51, the only activity circuitwise is the operation of the ring counter consecutively transferring an enable level to GA's 41 to 45, then to GA's 46 to 50, and repeating. The rest of the circuit remains dormant.

Information pulses from the receiver are applied at input terminal 51; these negative pulses are coincident in time with the clock pulses. These pulses are applied to a delay multivibrator, which produces a pulse, the trailing edge of which occurs 11 ms. after the input pulse. The trailing edge is differentiated by differentiating circuit 53, and amplified by amplifier 54; the delayed pulses are then applied to terminal 57, which is connected to input terminal B of BA's 41 to 50. The multivibrator is used to delay the information pulses so that they will be applied to the gated amplifiers somewhere near the middle of the 30 ms. synchronizing pulse interval.

Assuming that the character "Y" is being transmitted, the operation of the converter will then be as follows: the teletypewriter code element for the character "Y" is shown in FIG. 3A to consist of a 22 ms. "start" space and a 22 ms. mark, alternating for six positions, and a final 31 ms. "stop" mark. The transmitting converter simply transmits the five element data code of FIG. 3B, consisting of 30 ms. alternating marks and spaces for 150 ms. The receiver provides the output of FIG. 3C, consisting of three narrow pulses, a pulse occurring in the mark position, and the absence of a pulse representing the space position. This pulse input is applied at terminal 51 of FIG. 1; delay multivibrator 52 and differentiating circuit 53 cause the information pulse to be delayed by 11 ms.; since at this time terminal D of ring counter flip-flop RC1 is enabled, as is terminal 23 of flip-flop 21, "and" gate 31 provides an output to enable GA41; the delayed information pulse, applied to all the gated amplifiers 41 to 50 in parallel, can only pass through GA41, and is applied to terminal E of FF1A of storage register 55, switching FF1A to —6 volts and thereby storing a "one" in this position. The next clock pulse moves the enable of the ring counter to flip-flop RC2 which is applied through "and" gate 32 to A42; since during this interval there is no information pulse present at the receiver input, nothing passes through GA42 so that FF2A of register 55 remains in the zero state. In a similar manner, FF3A and 5A are switched to one, and FF4A remains at zero, so that after the fifth clock pulse, the contents of register 55 are 1, 0, 1, 0, 1; the pulse information input has been changed to DC levels of the same pattern as the pulse input.

The enable from RC5 is also applied to GA16, so that the sixth clock pulse passes through GA16 and switches FF21 so that terminal 22 is at —6 volts; this allows the next input character to be stored in storage register 56. This pulse is also applied to GA18 which at this time is enabled by "OR" gate 20. "OR" gate 20 is a ten input gate, each input of which is connected to a flip-flop output of registers 55 and 56 and provides a —6 volt output when there is a "one" in any flip-flop of either register, or when there is any combination of "ones" in any register. Since at this time there is a 1–0–1–0–1 pattern stored in register 55, GA18 is enabled with −6 volts from "OR" gate 20, allowing the pulse from GA16 to pass through; this pulse is applied to GA's 68 to 72 in parallel, which are enabled through diodes 58 to 62 by the contents of register 55. In this instance, the −6 volt enable from flip-flops 1A, 3A, and 5A of register 55 appears at the enable input of GA's 68, 70, and 72, so that the pulse from GA18 passes through these amplifiers, and is prevented from passing through GA's 69 and 71 by the absence of an enable; the pattern stored in register 55 is therefore transferred to the shift register; in addition, the pulse from GA18 places a "zero" in the start flip-flop, and a "one" in the stop flip-flop, giving the required start space and stop mark for operating the teletypewriter relay. All that is now required is to convert the shift register contents into 22 ms. pulses to operate the relay. This can be done by application of six shift pulses spaced 22 ms. apart to the shift bus of the shift register.

The six shift pulses are generated by the pulse train generating circuit. The detailed description and operation of this circuit are the subject of a separate patent application, entitled "Pulse Train Generating Circuit" by William J. Achramowicz, Serial No. 341,142; filed Jan. 29, 1964. The output pulse of GA18, shown at 19, FIG. 2*b*, is also used to initiate the generation of six shift pulses by applying it to the input of the pulse train generating circuit 24; the six shift pulses generated are shown at 25. FIG. 2B; it can be seen that the first shift pulse is delayed 22 ms. from the initiating pulse, and the following five pulses are separated by 22 ms. intervals. The application of the six shift pulses to the shift register will produce the required 22 ms. pulses to operate the teletypewriter relay, as shown in FIG. 3D.

The start flip-flop of shift register 73 is the output flip-flop which drives the teletypewriter relay through buffer circuitry to prevent loading of the start flip-flop. The pulse from GA18 which transferred the contents of storage register 55 to the shift register also switched the start flip-flop to put a "zero" or "start" space in the start flip-flop, and switched stop flip-flop, putting a "one" or "stop" mark in the stop flip-flop. In FIG. 2B, waveform 73 shows the output of the shift register after the application of each pulse. Waveform 73 shows alternating 22 ms. spaces and marks representing the letter Y with a 22 ms. start space and an 18 ms. stop mark.

The waveform of each stage of the shift register is also shown in FIG. 2B. It can be seen that after the sixth shift pulse, the "stop" mark is in the start flip-flop, and the shift register awaits transfer of the next character from storage register 56, when a "start" space is again placed in the start flip-flop, and the character is shifted out in the same manner. In the event that there is no further information input to the converter, FF start stays in the mark position, keeping the teletypewriter relay closed.

The storage registers are reset in the following manner: the −6 volts output of the stop flip-flop is applied to "and" gates 76 and 77; the other input to these gates is a terminal of flip-flop 21, terminal 22 connected to "and" gate 76, and terminal 23 connected to "and" gate 77; the same pulse which transferred the contents of storage register 55 to the shift register also switched flip-flop 21 so that terminal 22 of FF21 switched to −6 volts. Consequently, an enable appears at the output of gate 76, and a disable at gate 77. The first shift pulse from terminal 25, finding GA78 open, passes through to reset storage register 55 to zero; this pulse also shifts the enable voltage from the stop flip-flop, closing gate 76, so that GA78 and 79 remain disabled until the next character is transferred to the shift register from storage register 56 when gate 77 provides an enable to GA79 to allow resetting of register 56. Hence, it can be seen that as soon as the contents of a storage register are transferred to the shift register, the storage register is reset, and is ready for the input of the next information character.

Figure 3:
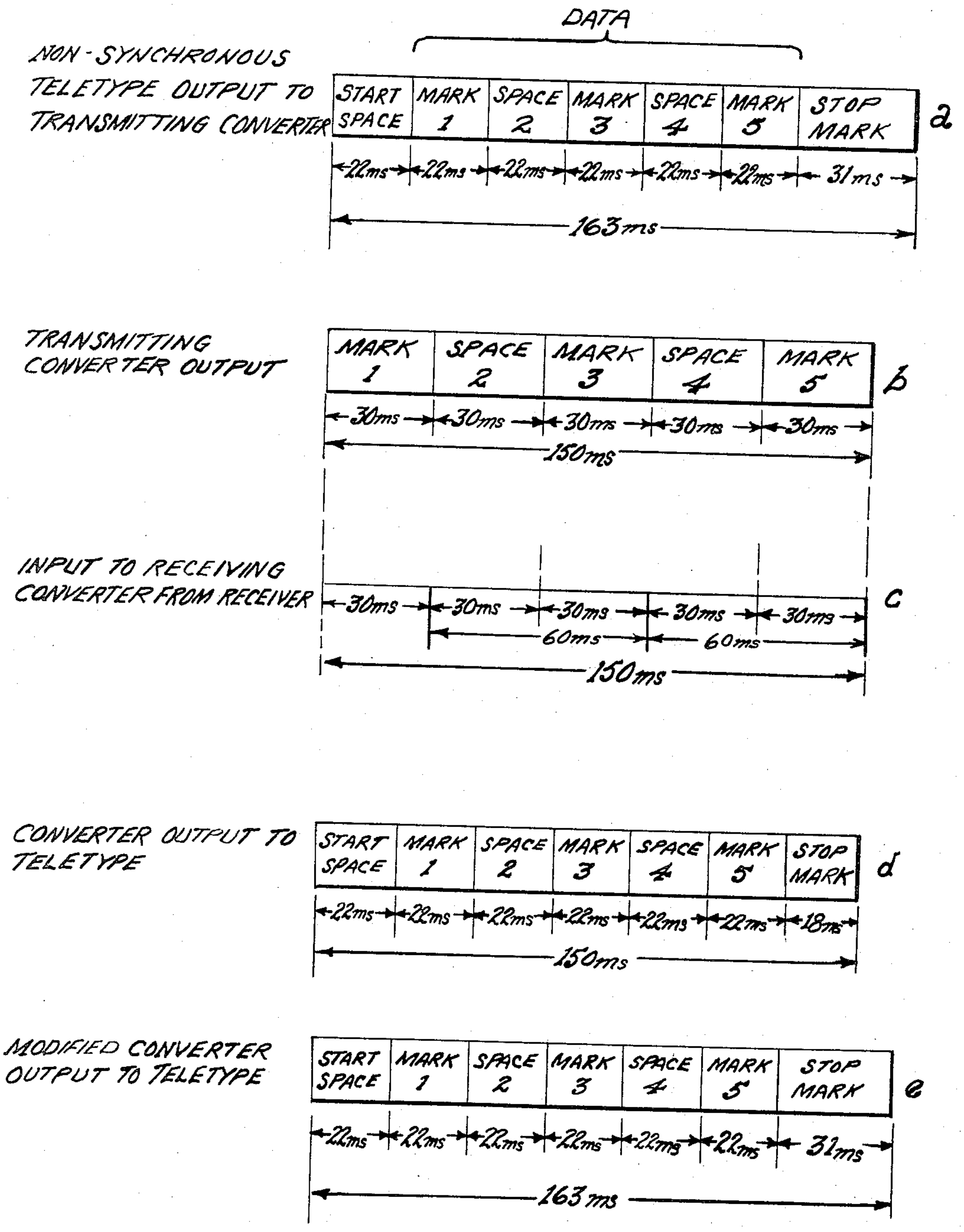
FIG. 3 illustrates the relative time relationship between a non-synchronous code output character of a teletypewriter, the synchronous output of a transmitting converter, the output of the radio receiver to teletypewriter converter, the output of the receiver-to-teletypewriter converter, and a modified output of a receiver converter.

In the transmission of teletypewriter characters, FIG. 3 shows that the teletypewriter operates at a rate of 163 ms. to a character, while the transmitting converter operates at a rate of 150 ms. to a character; in other words, the transmitting converter operates faster than the teletypewriter. This poses no problem in transmitting, since the transmitting converter has a provision for transmitting a blank character after every twelve or thirteen characters to allow the teletypewriter to "catch up" with the transmitting converter.

At the receiving end of the system, the input comes in at a 150 ms. rate and in the converter described above, the output from the shift register is also at a 150 ms. per character rate. This is possible because the "stop" mark of a teletypewriter is adjustable to operate satisfactorily with an 18 ms. stop mark. In the system described above, the teletypewriter hesitates slightly after twelve or thirteen characters when the receiving converter receives the blank spaces provided for in the transmission.

In the event that smoother operation of the teletypewriter is desired, the following system describes a modification which allows lengthening of the stop mark to 31 ms.

Figure 4:
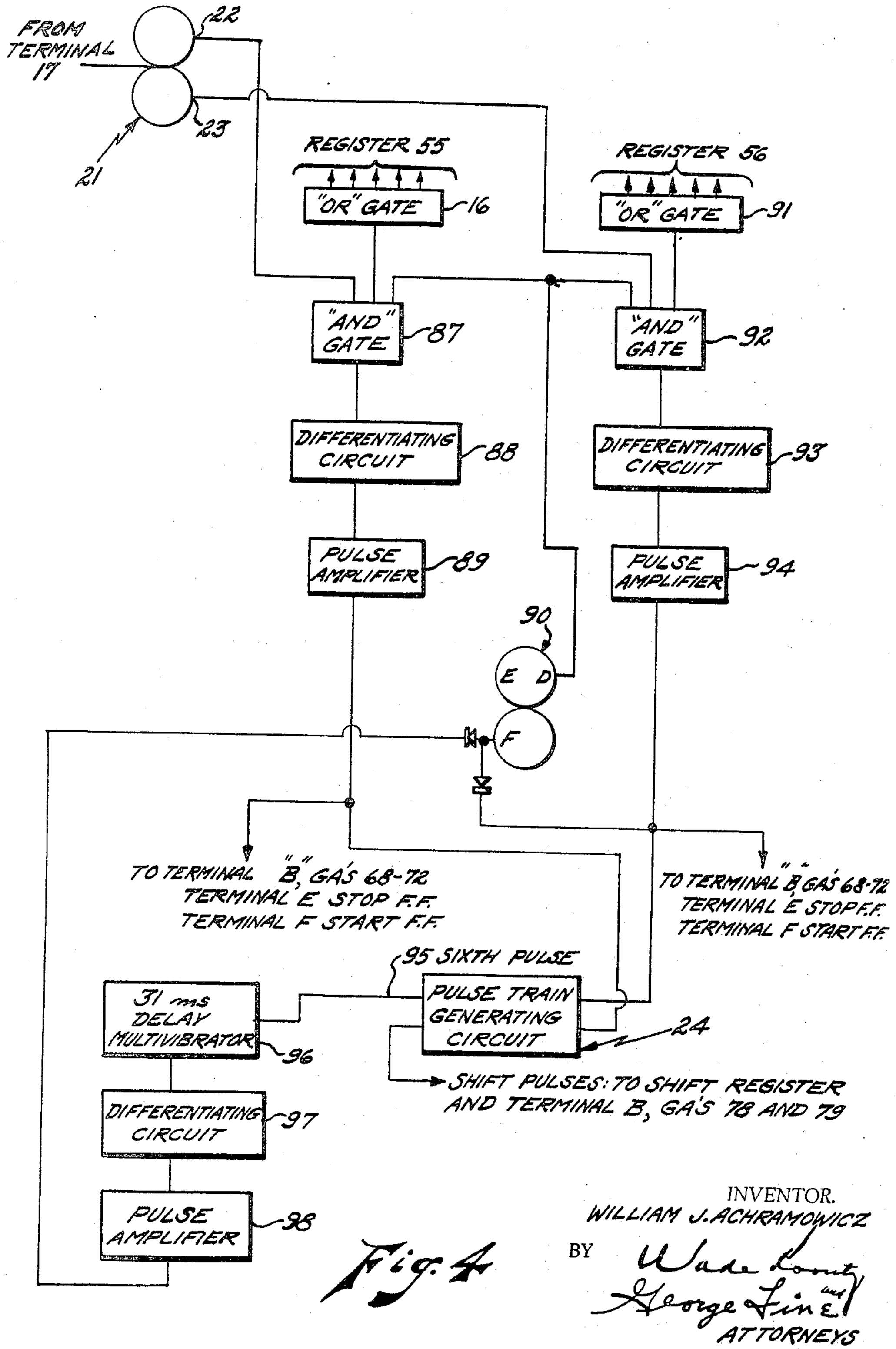
FIG. 4 is a modification of the apparatus of FIG. 1.

The logic network shown in FIG. 4 replaces "OR" circuit 20 and GA18 in the generation of six shift pulses separated by an interval of 31 ms. It is assumed that information has just been stored in register 55, as described previously. The operation of this network will now be described. Ring counter flip-flop RC5 applies a −6 volt enable directly to GA16; the sixth clock pulse, which moves the enable to RC1, passes through GA16 and switches flip-flop 21 so that terminal 22 of FF21 switches to −6 volts. "OR" gate 91 has no output at this time since there is no information in register 56; hence there is no output from either "and" gate 92 or pulse amplifier 94. Since there is a "Y" stored in register 55, "OR" gate 16 has an output applied to "and" gate 87. When flip-flop 21 switches so that terminal 22 goes to −6 volts, "and" gate 87 provides an output, since the third input to "and" gate 87 is connected to terminal D of flip-flop 90 which is normally at −6 volts. The output of gate 87 is differentiated by differentiating circuit 88 to provide a pulse to amplifier 89; the output pulse from amplifier 89 is used to place the information stored in register 55 through amplifiers 68 to 72 to shift register 73. The pulse also places a "start" space in start flip-flop, and a "stop" mark in the stop flip-flop, and initiates the generation of the six shift pulses from pulse train generating circuit 24. It also switches terminal D of flip-flop 90 to 0 volts thus preventing any further output from either amplifier 89 or 94.

In order to allow the "stop" mark to remain for 31 ms. in the "start" flip-flop at the end of every character, every six shift pulses are separated by a 31 ms. interval. This is accomplished as follows: the sixth shift pulse is taken from pulse train generating circuit 24 on line 95, and is applied to monostable multivibrator 96, which produces a pulse 31 ms. wide; the trailing edge of this pulse is differentiated by differentiating circuit 96 to provide a negative pulse which appears 31 ms. after multivibrator 96 is triggered; the pulse is amplified by amplifier 98, and is applied to terminal E of flip-flop 90 to switch flip-flop 90 back to −6 volts.

If at this time there is no information stored in register 56, "OR" gate 91 has no output, thereby preventing an output from amplifier 94; the "stop" mark will then remain in the start flip-flop of the shift register until the next information character is received.

If at this time storage register 56 contains information so that terminal 23 of flip-flop 21 is at −6 volts, "OR" gate 91 has an output, allowing the "and" gate 92 output to switch to −6 volts and thereby generate a pulse, so that a pulse appears at the output of amplifier 94 and in a manner similar to that described above for register 55, the contents of register 56 is transferred to the shift register, a "start" space and a "stop" mark are placed in the start flip-flop and the stop flip-flop respectively, terminal D of flip-flop 90 is switched to 0 volts, and the six shift pulses are again generated.

Since information is received at a 150 ms. rate and is fed to the teletypewriter at a 163 ms. rate, a condition is reached where register 55 may have information stored, and four stages of register 56 may have stored information, all at the same time; no difficulty is encountered, since the transmission of a 150 ms. interval of spaces allows the receiving converter to shift out the information without any time conflict; an empty storage register is thus always available when information is being received.

It can be seen that three conditions must be fulfilled before the information from a storage register is transferred to the shift register to be shifted out—(1) the storage register must contain information, (2) flip-flop 21 must have switched so that incoming information is being transferred to an empty storage register, (3) terminal D of flip-flop 90 must have switched to —6 volts.

When consecutive synchronous characters are being received, the switching of flip-flop 90 to —6 volts will generate the transfer pulse which also triggers the pulse train generating circuit; when characters received in the synchronous transmission are not consecutive (i.e. there is a time interval between characters) the switching of flip-flop 21 will trigger the above operation. This allows the shift register to complete the shifting out process before the transfer of the next information character from storage.

While there is described above the principles of this invention in connection with specific apparatus, it is to be clearly understood that this description is made only by way of example and not as a limitation to the scope of this invention.

What is claimed is:

1. An electronic code converter for converting a synchronous mark-space input signal from a receiver to a non-synchronous mark-space output signal for operation of a teletypewriter, comprising a source of synchronous clock pulses, a ring counter driven by said clock pulses, two banks of storage registers, a bank of read-in gates feeding each of said storage registers, a source of synchronous mark-space information pulses corresponding to the code elements of a particular teletypewriter character and coincident in time with said clock pulses applied to said read-in gates allowing transfer of the mark-space code elements into said bank of storage registers, a switching flip-flop controlled by said ring counter which alternately transfers consecutive information characters into each of said storage registers, a shift register, a bank of output gates alternately connected to the output of each of said storage registers allowing transfer of the contents of said storage register to said shift register, a pulse train generating circuit, a gate activated by the contents of one of said storage registers to allow a clock pulse to transfer the information from said storage register to said shift register and initiate the generation of a pulse train from said pulse train generating circuit to provide the shift pulses to shift out the information from said shift register in serial form to drive said teletypewriter, wherein said transfer and initiating pulse to said pulse train generating circuit is alternately generated by one of a pair of logic networks, each of said networks comprising an "or" gate energized by one of said storage registers, a coincidence circuit, and an auxiliary flip-flop, said coincidence circuit energized by the output of said "or" gate, said switching flip-flop, and said auxiliary flip-flop, means for deriving a pulse from the output of said coincidence circuit to initiate the generation of said pulse train, and means for delaying the sixth pulse of said pulse train and utilizing said sixth delayed pulse to switch said auxiliary flip-flop to an initial condition, and two gates activated by a stage of said shift register and an output of said switching flip-flop to provide a reset pulse for each of said storage registers.

References Cited

UNITED STATES PATENTS

| | | | |
|---|---|---|---|
| 2,373,970 | 4/1945 | Mathes | 178—17.5 |
| 2,879,332 | 3/1959 | Reek et al. | 178—26.5 |
| 2,903,513 | 9/1959 | Phelps et al. | 178—17.5 |

THOMAS A. ROBINSON, *Primary Examiner.*